United States Patent [19]

Rossi et al.

[11] Patent Number: 5,378,269
[45] Date of Patent: Jan. 3, 1995

[54] RECORDING LIQUIDS FOR INK-JET RECORDING

[75] Inventors: Louis J. Rossi, Rochester, N.Y.; Sunita P. Chavan, Beaver Creek, Ohio

[73] Assignee: Scitex Digital Printing, Inc., Dayton, Ohio

[21] Appl. No.: 176,025

[22] Filed: Dec. 29, 1993

[51] Int. Cl.$^6$ ............................................. C09D 11/02
[52] U.S. Cl. .................................. 106/22 K; 534/827; 534/728
[58] Field of Search ............. 106/22 K; 534/728, 825, 534/827

[56] References Cited

U.S. PATENT DOCUMENTS

| | | | |
|---|---|---|---|
| 2,966,418 | 12/1960 | Anderson | 106/22 K |
| 2,990,405 | 6/1961 | Pepper et al. | 106/22 R |
| 3,546,202 | 12/1970 | Budesinsky et al. | 534/827 |
| 3,828,020 | 8/1974 | Tartter | 106/22 K |
| 3,915,952 | 10/1975 | Sailer et al. | 534/687 |
| 4,047,944 | 9/1977 | Rossi et al. | 534/827 |
| 4,145,299 | 3/1979 | Ford, Jr. et al. | 534/827 |
| 4,247,459 | 1/1981 | Ford, Jr. et al. | 534/827 |
| 4,414,152 | 11/1983 | Santilli et al. | 534/827 |
| 4,414,320 | 11/1983 | Santilli et al. | 430/106 |
| 4,557,761 | 12/1985 | Kobaysashi et al. | 106/22 K |
| 4,585,484 | 4/1986 | Haruta et al. | 106/22 K |
| 4,601,756 | 7/1986 | Chiba et al. | 106/22 K |
| 4,654,282 | 3/1987 | Ng et al. | 430/54 |
| 4,666,519 | 5/1987 | Akiyama et al. | 106/22 K |
| 4,685,968 | 8/1987 | Palmer et al. | 106/22 H |
| 4,761,810 | 8/1988 | Askeland et al. | 106/22 H |
| 4,786,327 | 11/1988 | Wenzel et al. | 106/22 H |
| 4,793,860 | 12/1988 | Murakami et al. | 106/22 K |
| 4,810,292 | 3/1989 | Palmer et al. | 106/22 H |
| 4,994,110 | 2/1991 | Stoffel | 106/22 R |
| 5,026,426 | 6/1991 | Russell | 106/22 H |
| 5,049,189 | 9/1991 | Friswell et al. | 106/22 K |
| 5,055,566 | 10/1991 | Gregory et al. | 106/22 K |
| 5,290,347 | 3/1994 | Ono et al. | 106/22 K |

FOREIGN PATENT DOCUMENTS 61258-084-A 5/1985 Japan.
02048-951-A 3/1991 Japan.

*Primary Examiner*—Helene Klemanski
*Attorney, Agent, or Firm*—Barbara Joan Haushalter

[57] ABSTRACT

A recording liquid for ink-jet recording comprising coloring matter, which is an image-forming component, and a liquid medium for dissolving the coloring matter therein. The liquid medium is ethanol and the coloring matter is a dye represented by the following general formula (A):

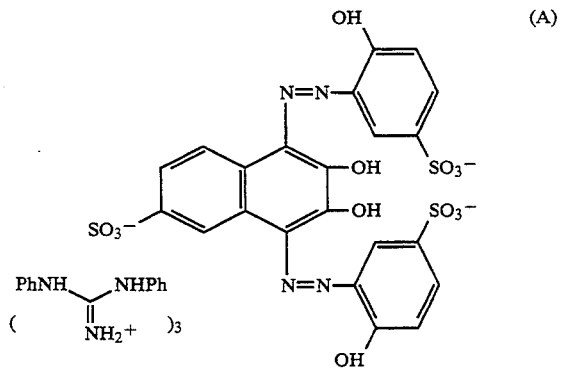

or the following general formula (B):

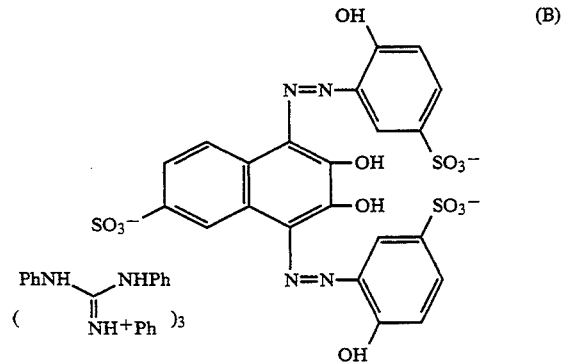

as an image-forming component.

4 Claims, No Drawings

RECORDING LIQUIDS FOR INK-JET RECORDING

BACKGROUND OF THE INVENTION

1. Field of the Invention

The present invention relates to a recording liquid suitable for use in the ink-jet recording process in which droplets of recording liquid called an ink are flown from a recording head through its orifices to perform recording, and more particularly to a recording liquid giving an ideal black color.

2. Description of the Prior Art

Ink-jet recording generates less noise and permits high speed recording on plain paper without the necessity for any special fixing treatment, so that various types of ink-jet recording systems currently are being investigated vigorously.

The recording liquid used for these ink-jet recording systems needs to fulfill several requirements. For example, its physical properties such as viscosity, surface tension, etc. should be each within a proper range, so that it will not clog a fine spout (orifice); it should form images of bright color tone and of sufficiently high optical density, and it should not undergo a change in physical properties or deposit solid matter, during storage.

In addition, recording by the recording liquid should be accomplished without particular restriction as to the kind of recording medium used, including paper, which is the most typical recording medium; it should exhibit a high rate of fixing on recording media; it should give images excellent in resistances to water, light, and attrition; it should form images with a high degree of resolution; it should be substantially non-corrosive as to any of the components of an ink-recording device it contacts, and it should not easily or readily absorb water vapor from the atmosphere.

Since the recording liquid used for ink-jet recording is composed basically of a coloring component dye and its solvent, the above performance characteristics required are much affected by the inherent properties of the dye. Accordingly, it is very important in the art to select a dye so as to provide the recording liquid with the above performance characteristics.

The solubility of the dye in the liquid medium is particularly important. A high solubility is essential for maintaining a good anti-clogging property and solution stability of the recording liquid.

It is also particularly important when performing black color printing that the black recording liquid has a pure black color tone without a tinge of any other color. Therefore, it is also very important in the art to properly select dyes as coloring components taking the color tone given by a black recording liquid into consideration.

However, almost none of the known recording liquids in black color satisfy the above noted requirements, particularly when ethanol is used as the primary liquid medium, and especially with respect to solubility and providing a true jet-black color. For example, Solvent Black 46 and a blend of Solvent Black 48 and Solvent Brown 52 are dyes currently being used as coloring components in recording liquids in which ethanol is the liquid medium to give a primary black color. However, Solvent Black 46 gives a purple color rather than a jet-black color and is difficult to filter and exhibits poor resolution. Solvent Black 48 needs to be blended with Solvent Brown 52 to give a black color and to produce a recording liquid having adequate filterability and exhibiting acceptable resolution. Thus, there is a continuing need to develop a black recording liquid in which ethanol the primary liquid medium which meets the above requirements.

SUMMARY OF THE INVENTION

In accordance with the present invention, it has been found that the tris (di- or triphenylguanidinium) salts of 6,7-dihydroxy-5,8-bis[(2-hydroxy-5-sulfophenyl)azo]-2-naphthalenesulfonic acid provide dyes of very high solubility in ethanol and give inks of jet-black color.

The diphenylguanidinium salt can be represented by the general formula (A):

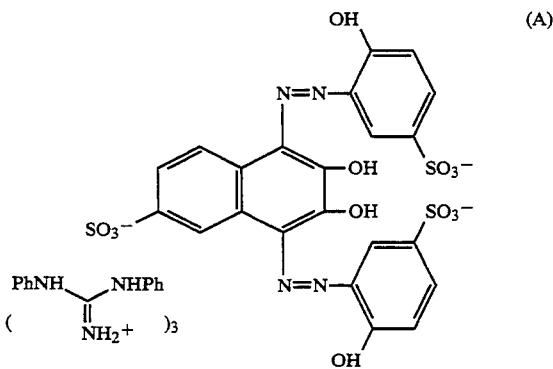

and the triphenyl guanidinium salt can be represented by the general formula (B):

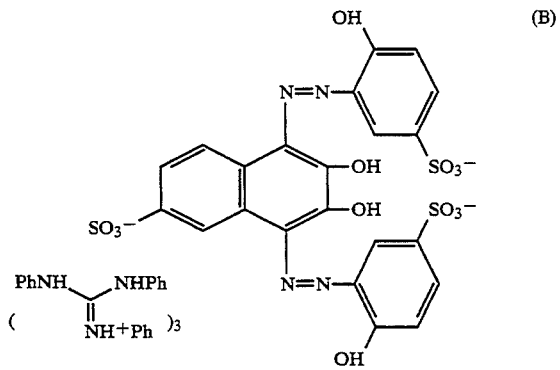

Thus, according to one aspect of the invention, there is provided a recording liquid for ink-jet recording comprising coloring matter, which is an image-forming component, and a liquid medium for dissolving the coloring matter, said liquid medium comprising ethanol and characterized by containing at least one of the dyes represented by the general formula (A):

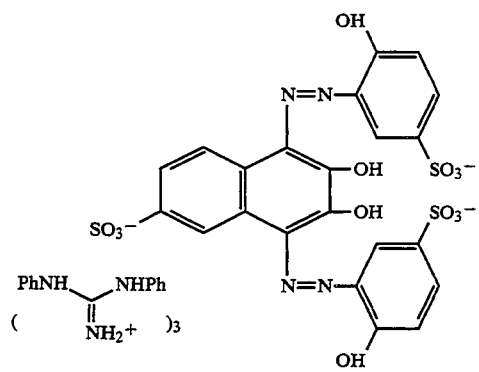

or the general formula (B):

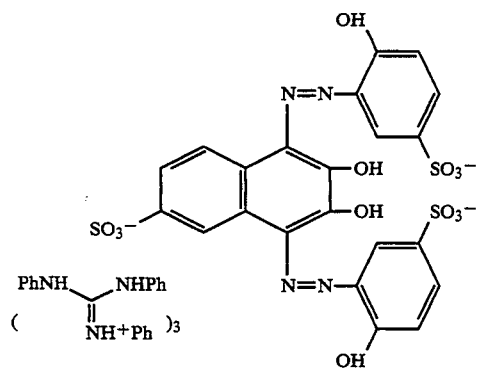

as an imaging-forming component.

Since the salt compositions utilized as the image-forming components in the recording liquids of the present invention are believed to be novel salt compositions, in another aspect of the present invention there are provided novel salt compositions having the general formula (A):

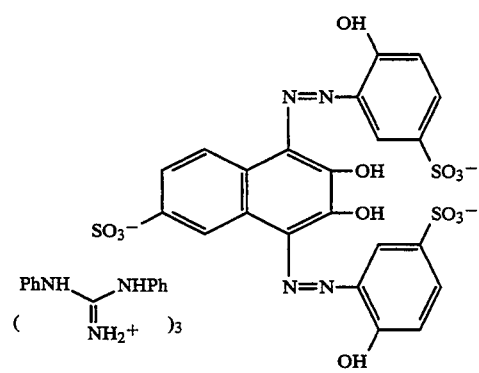

or the general formula (B):

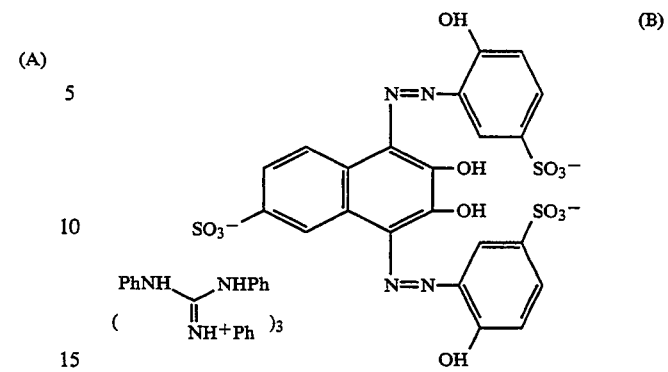

DETAILED DESCRIPTION OF THE PREFERRED EMBODIMENTS

The dyes of this invention are the tris (di- or triphenylguandinium) salts of 6,7-dihydroxy-5,8-bis[(2-hydroxy-5-sulfophenyl) azo]-2-naphthalenesulfonic acid. They can be prepared by treating (i.e., converting) the triammonium salt of 6,7-dihydroxy-5,8-bis[(2-hydroxy-5-sulfophenyl)azo]-2-naphthalenesulfonic acid to the di- or triphenylguanidinium salts thereof in aqueous solution with an aqueous solution of an acid salt of the arylguanidine, usually and preferably, the hydrochloride acid salt thereof. The pH of the resulting reaction solution is adjusted to near neutral, approximately 6-8 before isolation. Outside of this pH range there is danger of hydrolysis of the product. Other methods may also be employed to effect the replacement of the triammonium cations, exemplary of which are conventional ion exchange and reverse osmosis techniques well-known to those skilled in the art. It is desirable that all of the triammonium cations be replaced in order to achieve the best image density.

The content of the dyes as coloring component to be used in the recording liquid, that is, the total content of the tris (di- or triphenylguanidinium) salt of 6,7-dihydroxy-5,8-bis[(2-hydroxy-5-sulfophenyl)azo]-2-naphthalenesulfonic acid generally is in the range of approximately 0.5 to 20%, preferably 0.5 to 15% and particularly 1–10%, by weight, based on the total weight of the recording liquid.

The recording liquid of this invention contains ethanol as the main liquid component. The ethanol content in the recording liquid generally is in the range of approximately 10 to 90%, preferably 10–80% and particularly 20–70%, by weight, based on the total weight of the recording liquid.

The recording liquid of this invention, prepared from the components mentioned above, in itself has excellent and balanced recording performance characteristics. For further improving these characteristics, however, known various additives may also be incorporated into the recording liquid. The examples of these additives are viscosity modifiers such as polyvinyl alcohol, cellulosic materials and other ethanol-soluble resins; various types of cationic, anionic and nonionic surfactants; surface tension modifiers such as diethanolamine and triethanolamine, antimolds, fungicides, corrosion inhibitors, and the like.

When the recording liquid is used in the ink-jet recording system which discharges a recording liquid by the action of thermal energy, thermal properties (e.g., specific heat, thermal expansion coefficient and heat conductivity of the recording liquid may be adjusted, if necessary.

As described above, this invention provides a recording liquid which has the following advantages: its viscosity and surface tension are each in a proper range: it does not clog a fine orifice; it gives sufficiently dense images; during storage, no change occurs in its physical properties and no precipitate forms; it is applicable on various recording media without any particular restriction; it gives images quickly fixable and excellent in resistances to water, light and attrition and in degree of resolution; it has a pure black color tone without a tinge of any other color; it is substantially noncorrosive as to any of the components of an ink-jet recording device in which it comes into contact with and it does not easily or readily absorb water vapor from the atmosphere.

This invention is illustrated in more detail with reference to the following Examples.

EXAMPLE 1

Preparation of Tris (1,3-Diphenylguanidinium) salt of 6,7-Dihydroxy-5,8-Bis[(2-Hydroxy-5-Sulfophenyl)azo]-2-Naphthalenesulfonic Acid.

Triammonium 6,7-dihydroxy-5,8-bis[(2-hydroxy-5-sulfophenyl)azo]-2-naphthalenesulfonic acid (34.6 g; 0.50 mole) was suspended in 500 milliliters of deionized water. The mixture was heated to approximately 80° C. and stirred to complete solution. A solution of 34.8 g (0.160 mole) of 1,3-diphenylguanidine in 357 milliliters of deionized water and 15 milliliters (0.18 equivalents) of 12N hydrochloric acid was prepared at room temperature. The solution was clarified by filtration and added rapidly to the triammonium 6,7-dihydroxy-5,8-bis[(2-hydroxy-5-sulfophenyl) azo]-2-naphthalenesulfonate solution. The resultant mixture was then allowed to cool to room temperature. A dark solid precipitated from the solution, was collected by filtration, washed with water, and dried at about 70° C. to yield 56.5 g of product.

EXAMPLE 2

A black recording liquid for an ink-jet recording was prepared according to the following formulation:

|  | Weight Percent |
| --- | --- |
| Dye: Tris (diphenylguanidinium) 6,7-dihydroxy-5,8-bis[(2-hydroxy-5-sulfophenyl)azo]-2-naphthalenesulfonate (prepared as described in Example 1) | 6.0 |
| Corrosion inhibitor | 0.8 |
| Binder/resin | 6.0 |
| Ethanol | 87.1 |
| Surfactant | 0.1 |
| Total | 100 |

The above amounts of the components were thoroughly mixed to form a homogenous solution, which was then pressure-filtered through a membrane filter having a nominal pore size of 0.45 micrometer. The filtrate was degassed with vacuum pump and made up into a recording liquid. The dye was observed to be highly soluble in the ethanol liquid medium.

This recording liquid was tested for its ability to provide an ideal jet-black color by using an ink-jet recorder of the continuous type in which electrically charged droplets of recording liquid are continuously produced and parts of the droplets are used for recording. As a result, this recording liquid provided printed letters on plain bond paper exhibiting an ideal black color which was not tinged with other tone. The recording liquid also exhibited superior optical density, heat stability, corrosion resistance and water tolerance compared to other recording liquids utilizing ethanol as the primary liquid medium and containing other commercially available black dyes.

This invention has been described in detail with particular reference to preferred embodiments thereof, but it will be understood that variations and modifications can be effected within the spirit and scope of the invention.

We claim:

1. Tris (diphenylguanidinium) salt of 6,7-dihydroxy-5,8-bis [(2-hydroxy-5-sulfophenyl)azo]-2-naphthalenesulfonic acid.

2. Tris (triphenyl guanidinium) salt of 6,7-dihydroxy-5,8-bis [(2-hydroxy-5-sulfophenyl)azo]-2-naphthalenesulfonic acid.

3. A recording liquid for ink-jet recording comprising coloring matter, which is an image forming component, and a liquid medium for dissolving the coloring matter, said liquid medium comprising ethanol and characterized by containing at least one of the dyes represented by the general formula (A):

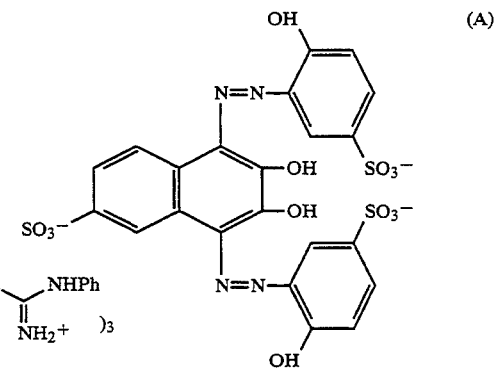

or the general formula (B):

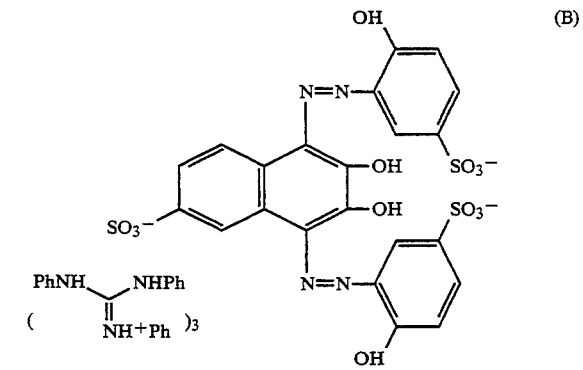

as an image-forming component.

4. The recording liquid of claim 3, wherein the dye represented by the general formula (A) or the general formula (B) is contained in an amount of 0.5 to 20 percent, by weight, based on the total weight of the recording liquid.

* * * * *